United States Patent
Chang et al.

(10) Patent No.: US 6,736,022 B2
(45) Date of Patent: May 18, 2004

(54) VIBRATION REDUCTION GEAR STRUCTURE OF AN IMAGE INPUT AND OUTPUT DEVICE

(75) Inventors: Martin Chang, Hsin-Chu (TW); Thomas Sheng, Hsin-Chu (TW)

(73) Assignee: Avision Inc., Hsin-Chu (TW)

( * ) Notice: Subject to any disclaimer, the term of this patent is extended or adjusted under 35 U.S.C. 154(b) by 42 days.

(21) Appl. No.: 10/091,187

(22) Filed: Mar. 6, 2002

(65) Prior Publication Data

US 2003/0029263 A1 Feb. 13, 2003

(30) Foreign Application Priority Data

Aug. 10, 2001 (TW) ..................................... 90213663 U

(51) Int. Cl.[7] ............................................. F16H 55/12
(52) U.S. Cl. ............................. 74/439; 74/440; 74/443
(58) Field of Search .......................... 74/439, 443, 440, 74/409

(56) References Cited

U.S. PATENT DOCUMENTS

| | | | | |
|---|---|---|---|---|
| 1,785,812 A | * | 12/1930 | Gribben | 295/11 |
| 4,078,445 A | * | 3/1978 | Kiser, Jr. | 474/150 |
| 4,174,643 A | * | 11/1979 | Tsukamoto | 74/443 |
| 4,269,262 A | * | 5/1981 | Knapp et al. | 165/8 |
| 5,452,622 A | * | 9/1995 | Fenelon | 74/411 |
| 5,596,905 A | * | 1/1997 | Kurosawa | 74/443 |
| 5,722,295 A | * | 3/1998 | Sakai et al. | 74/443 |
| 5,927,149 A | * | 7/1999 | Moody | 74/443 |
| 6,183,230 B1 | * | 2/2001 | Beardmore et al. | 418/171 |

\* cited by examiner

*Primary Examiner*—David Fenstermacher
(74) *Attorney, Agent, or Firm*—Charles E. Baxley

(57) ABSTRACT

A vibration reduction gear structure of an image input and output device includes a first gear supporting a second gear, and a vibration reduction portion made of vibration reduction material mounted on at least one of the first gear and the second gear. The other gear is rested on the vibration reduction portion. In such a manner, when the first gear and the second gear are rotated synchronously, the vibration between the first gear and the second gear may be reduced by the vibration reduction portion.

12 Claims, 12 Drawing Sheets

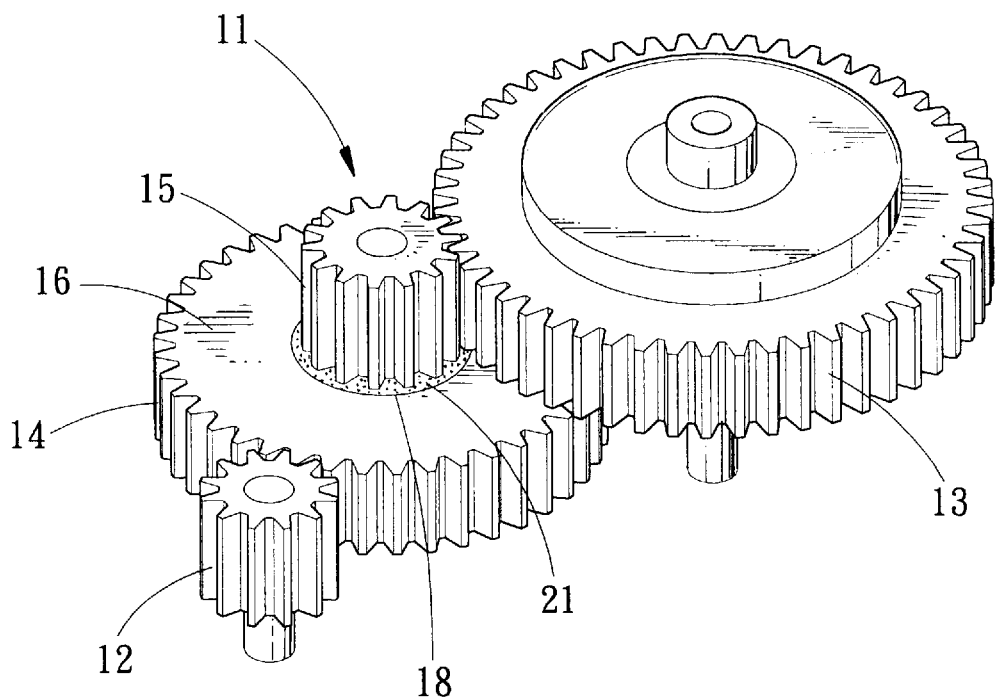
F I G. 1

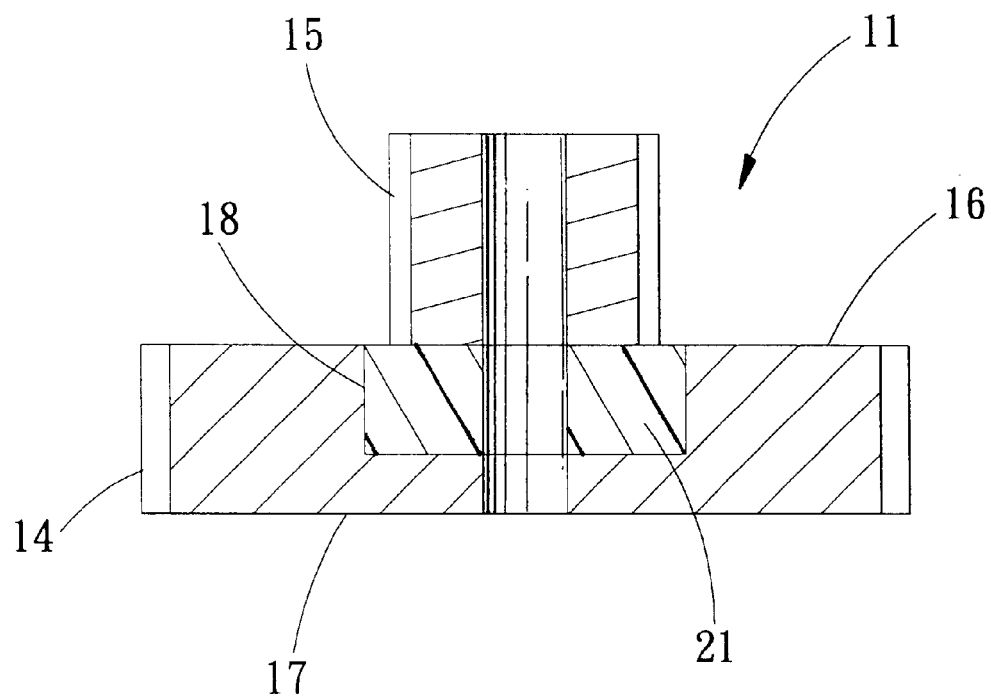
F I G. 2

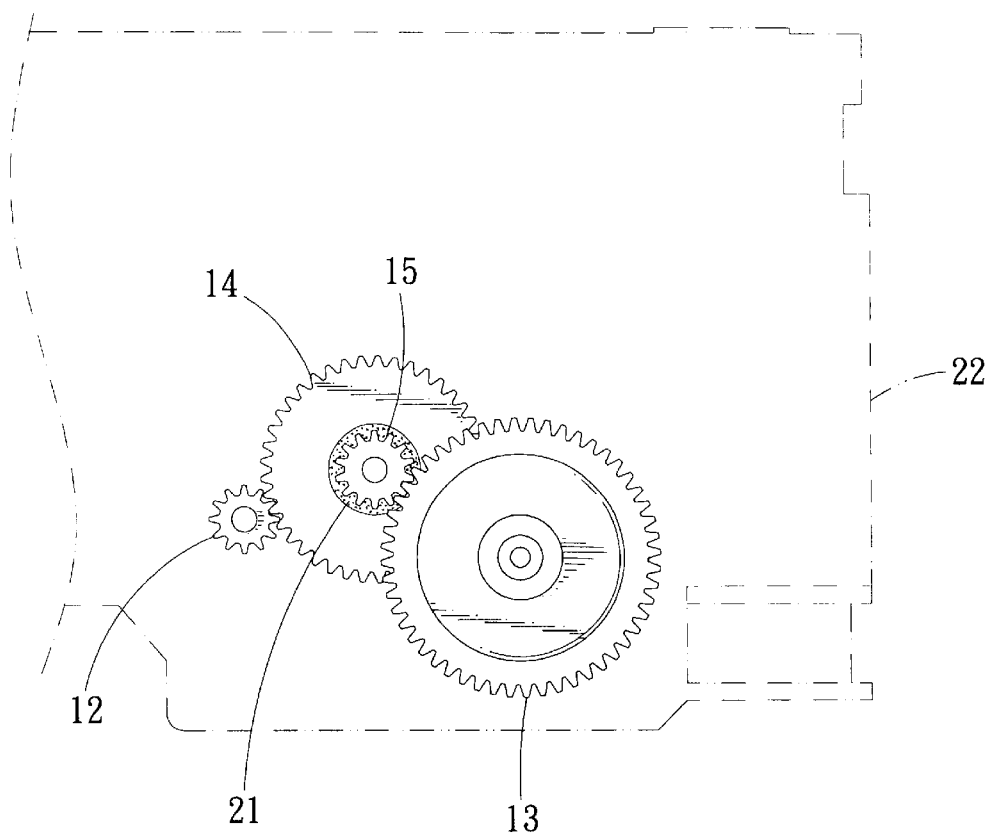
F I G. 4

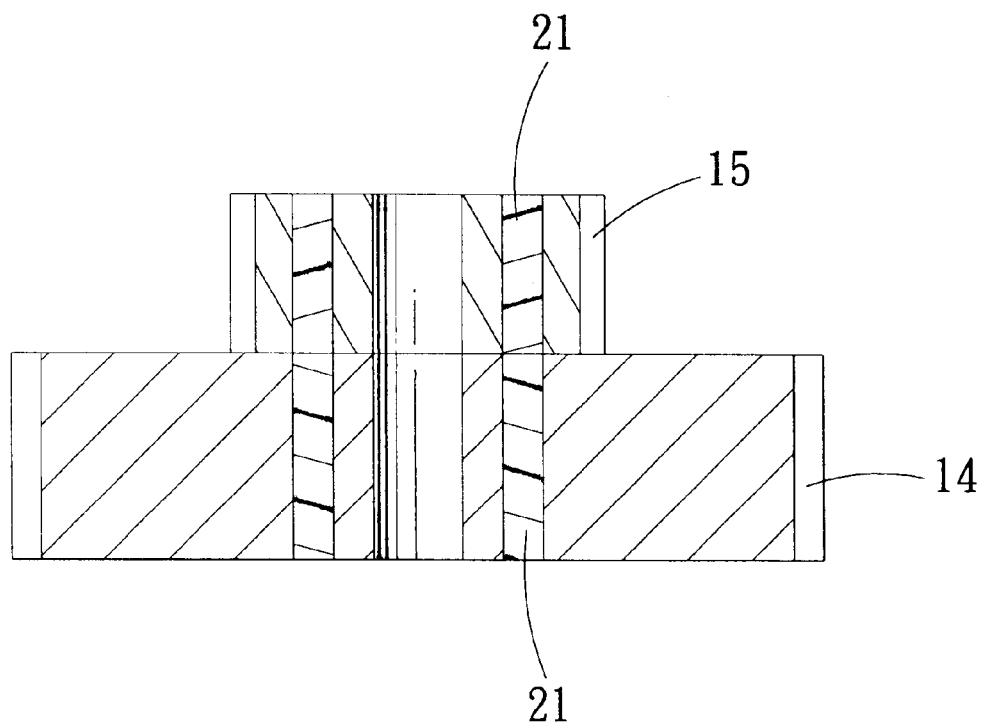
F I G. 11

VIBRATION REDUCTION GEAR STRUCTURE OF AN IMAGE INPUT AND OUTPUT DEVICE

BACKGROUND OF THE INVENTION

1. Field of the Invention

The present invention relates to a gear structure, and more particularly to a composite vibration reduction gear structure that is mounted in an image input and output device, to decrease noise during operation.

2. Description of the Related Art

A large-scale or small-scale device using the motor as its power supply often needs to co-operate with a reduction gear set to convert the high rotational speed output of the motor into a proper rotational speed.

For the large-scale device, couplers may be used to transmit the power between the motor, the reduction gear set, and the output shaft. The coupler may be made of vibration reduction material such as rubber. Thus, the coupler may reduce vibration and prevent noise from being produced during power transmission.

For the small-scale device, e.g., in the flatbed scanner or the sheet-fed scanner in the image input and output device, the motor may co-operate with the reduction gears and the belt to drive the scanning module. In the printer in the image input and output device, the motor may co-operate with the reduction gears to drive the printing head. The photocopier also uses cooperation of the motor with the reduction gears.

The image input and output device is a partial noise source in the office. Therefore, the design of the image input and output device already emphasizes the improvement of noise apparently. However, when the noise improvement design of the mechanisms everywhere reaches the limit, it is necessary to improve the detailed structures.

For power transmission, the motor may transmit the power of a high speed operation to the reduction gear set which may then transmit the power outward. During the transmission process, the elements may contact and hit each other, thereby producing vibration and noise. Thus, the contacts between the elements may be improved to reduce the vibration and noise during operation of the elements.

SUMMARY OF THE INVENTION

The primary objective of the present invention is to provide a vibration reduction gear structure of an image input and output device, wherein in the torque transmission path of the two gears, there is provided with a vibration reduction portion contacting the two gears. Thus, vibration produced between the two gears during operation may be absorbed, thereby preventing noise from being produced.

At least one of the two co-axially abutting gears is provided with the vibration reduction portion, and the other gear is rested on the vibration reduction portion. Thus, vibration producing between the two gears during operation may be absorbed, thereby preventing noise from being produced. The vibration reduction portion is made of material having a shock-absorbing feature, and may be integrally formed with or combined with the gear.

Further benefits and advantages of the present invention will become apparent after a careful reading of the detailed description with appropriate reference to the accompanying drawings.

BRIEF DESCRIPTION OF THE DRAWINGS

FIG. 1 is a pictorial view of the present invention;

FIG. 2 is a structural schematic view of the present invention;

FIG. 4 is a plan view of the present invention mounted on the chassis;

FIG. 11 is a further structural schematic view of the present invention; and

DETAILED DESCRIPTION OF THE PREFERRED EMBODIMENT OF THE INVENTION

Figure 3:
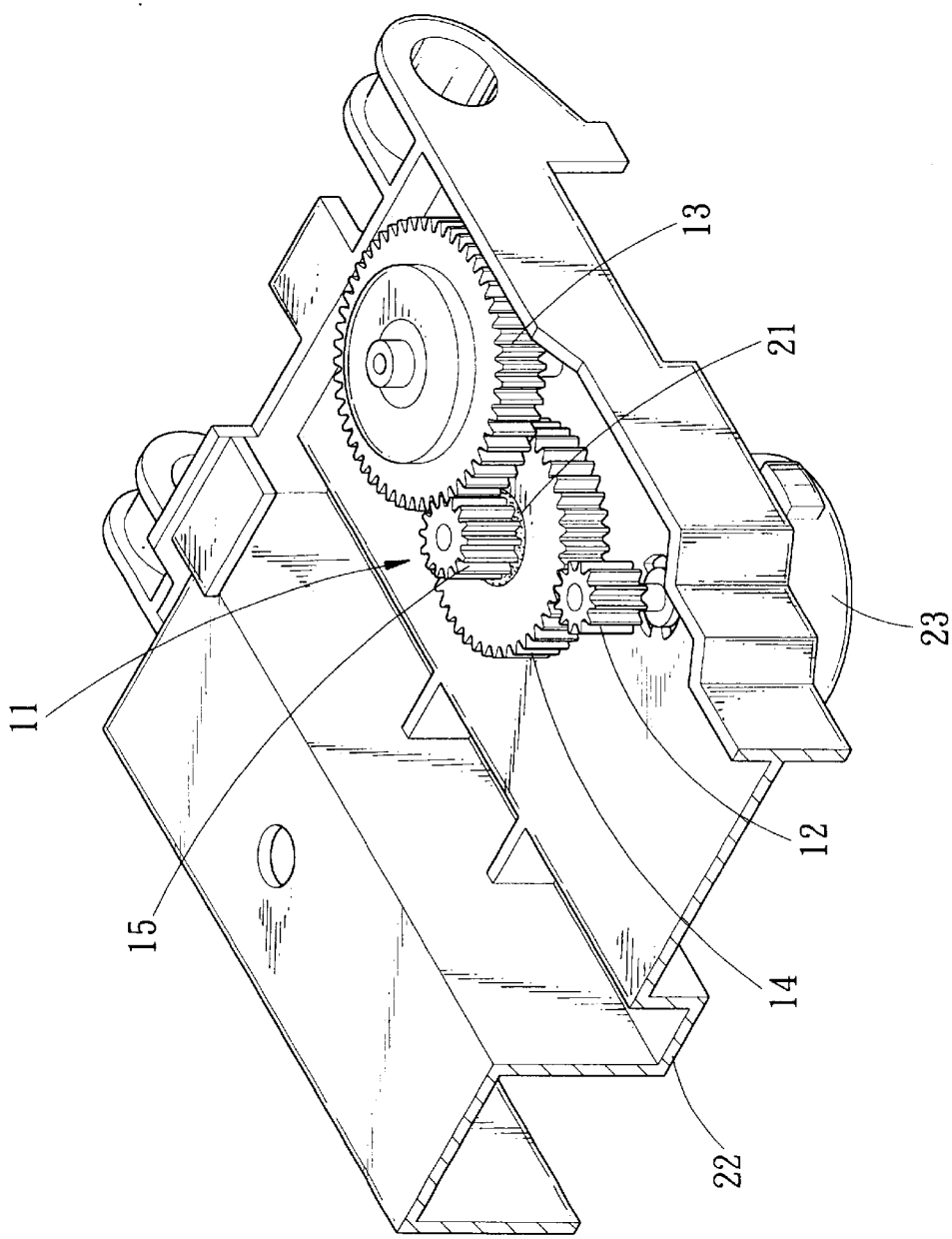
FIG. 3 is a pictorial view of the present invention mounted on the chassis.

Referring to FIG. 1, a combination of a reduction gear set 11, a drive gear 12, and a driven gear 13 is shown. The reduction gear set 11 includes a first gear 14, and a second gear 15 whose number of teeth is smaller than that of the first gear 14. The first gear 14 and the second gear 15 are connected co-axially, so that the first gear 14 and the second gear 15 may be rotated synchronously along the same direction. The first gear 14 having a larger number of teeth meshes with the drive gear 12, and the second gear 15 having a smaller number of teeth meshes with the driven gear 13.

Referring to FIGS. 1 and 2, the first gear 14 has a first side formed with a first surface 16, and a second side remote from the first surface 16 and formed with a second surface 17. The first surface 16 is formed with a receiving hole 18 directed toward the second surface 17.

A vibration reduction portion 21 is mounted in the receiving hole 18 of the first gear 14. The vibration reduction portion 21 is made of material having a shock-absorbing feature, such as a plastic material whose stiffness is smaller than that of the second gear 15, or made of a resin material. The outer diameter of the vibration reduction portion 21 is greater than that of the second gear 15. Thus, the second gear 15 may be entirely rested on the surface of the vibration reduction portion 21. In fabrication, the vibration reduction portion 21 and the first gear 14 may be formed integrally, or the vibration reduction portion 21 may be secured in the receiving hole 18 by a working manner to provide a positioning effect.

Figure 5:
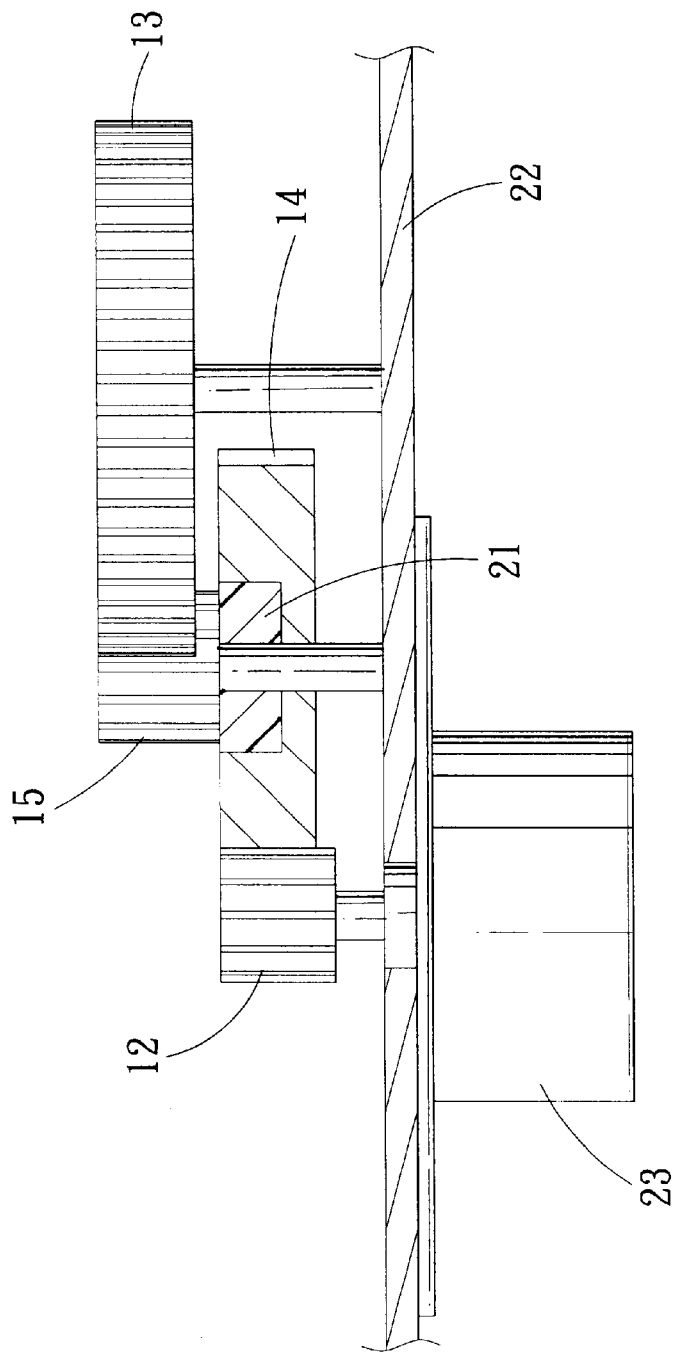
FIG. 5 is a structural schematic view of the present invention mounted on the chassis.

Referring to FIGS. 3–5, the reduction gear set 11 is mounted on the scanner chassis 22 to mesh with the drive gear 12 and the driven gear 13. When the motor 23 transmits the power from the drive gear 12 to the reduction gear set 11, the first gear 14 and the second gear 15 may be rotated synchronously. At the same time, a relative vibration may be produced between the first gear 14 and the second gear 15 by the driving of the drive gear 12 at a high speed.

The second gear 15 is entirely rested on the surface of the vibration reduction portion 21, the vibration reduction portion 21 has a stiffness smaller than that of the second gear 15, and the outer diameter of the vibration reduction portion 21 is greater than that of the second gear 15. Thus, when a relative vibration is produced between the first gear 14 and the second gear 15, the first gear 14 does not contact the second gear 15 directly. The vibration produced between the first gear 14 and the second gear 15 is absorbed by the vibration reduction portion 21. Thus, during operation of the reduction gear set 11, the effect of reducing vibration and preventing noise may be achieved.

Figure 6:
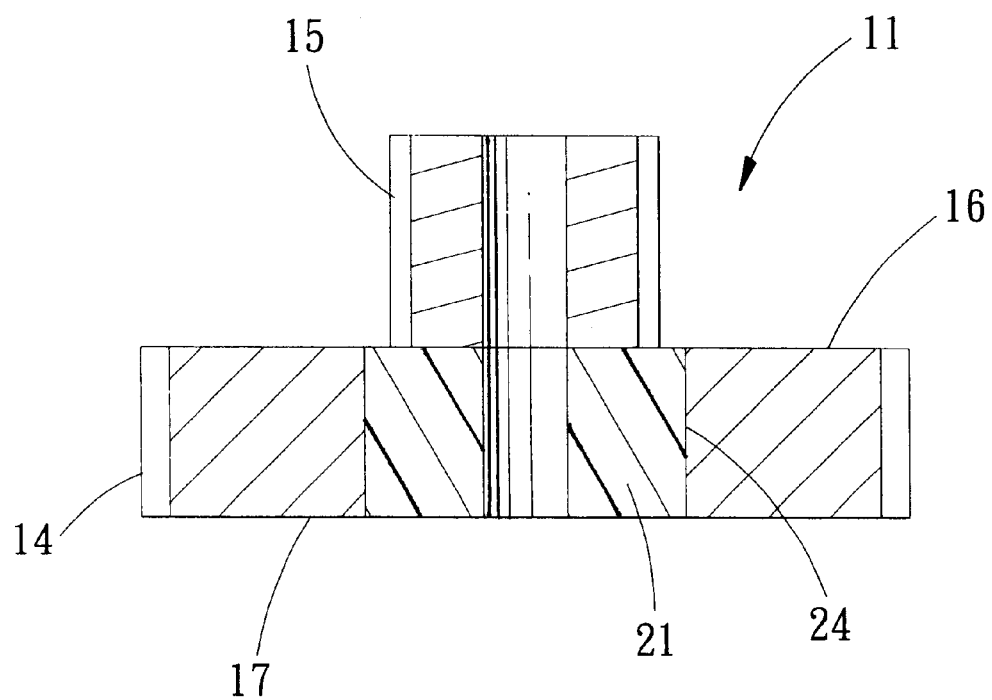
FIG. 6 is another structural schematic view of the present invention.

Referring to FIG. 6, a reduction gear set 11 includes a first gear 14 combined with a second gear 15. The first gear 14 and the second gear 15 are connected co-axially. The first gear 14 is formed with a through hole 24 that penetrates the first surface 16 and the second surface 17. A vibration reduction portion 21 is mounted in the through hole 24. The second gear 15 is entirely rested on the surface of the vibration reduction portion 21. Thus, when the reduction gear set 11 is rotated at a high speed, the vibration produced between the first gear 14 and the second gear 15 may be absorbed by the vibration reduction portion 21, thereby preventing noise from being produced.

The vibration reduction portion 21 and the first gear 14 may be formed integrally, so that the vibration reduction portion 21 may be positioned in the through hole 24 exactly. In addition, the first gear 14 may maintain its integrity.

Figure 7:
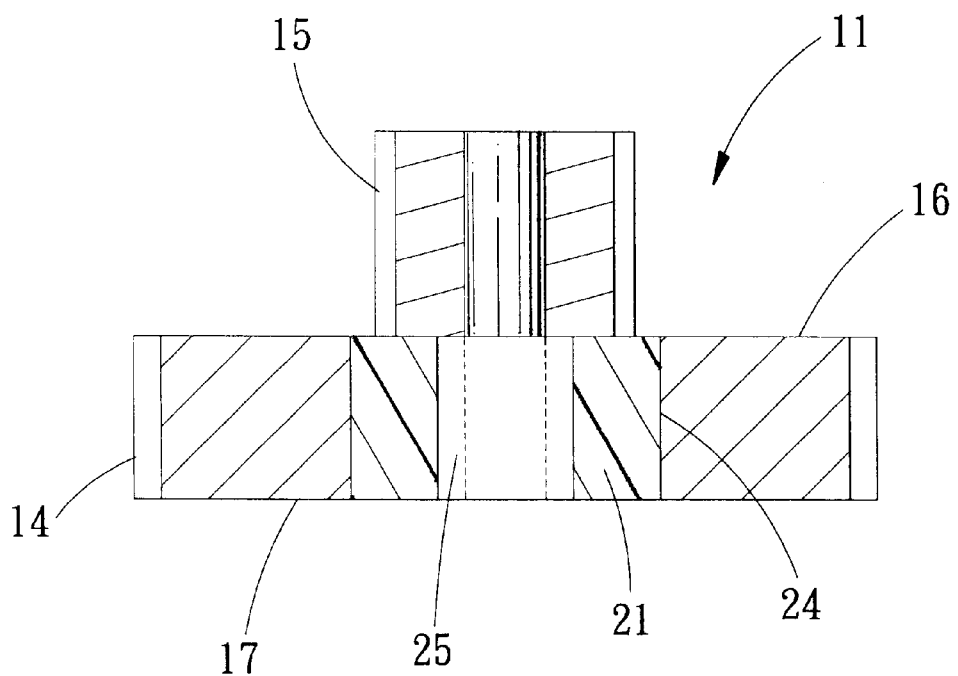
FIG. 7 is a further structural schematic view of the present invention.

Referring to FIG. 7, a reduction gear set 11 includes a first gear 14 combined with a second gear 15. The first gear 14 and the second gear 15 are connected co-axially. The first gear 14 is formed with a through hole 24 that penetrates the first surface 16 and the second surface 17. A vibration reduction portion 21 is mounted in the through hole 24. The center of the vibration reduction portion 21 is formed with a through hole 25 which is greater than the rotation shaft (a shown in phantom lines) of the motor. Thus, the second gear 15 is entirely rested on the surface of the vibration reduction portion 21, and is rotated with the reduction gear set 11 at a high speed. The vibration produced between the first gear 14 and the second gear 15 may be absorbed by the vibration reduction portion 21, thereby preventing noise from being produced.

The vibration reduction portion 21 and the first gear 14 may be formed integrally, so that the vibration reduction portion 21 may be positioned in the through hole 24 exactly. In addition, the first gear 14 may maintain its integrity.

Figure 8:
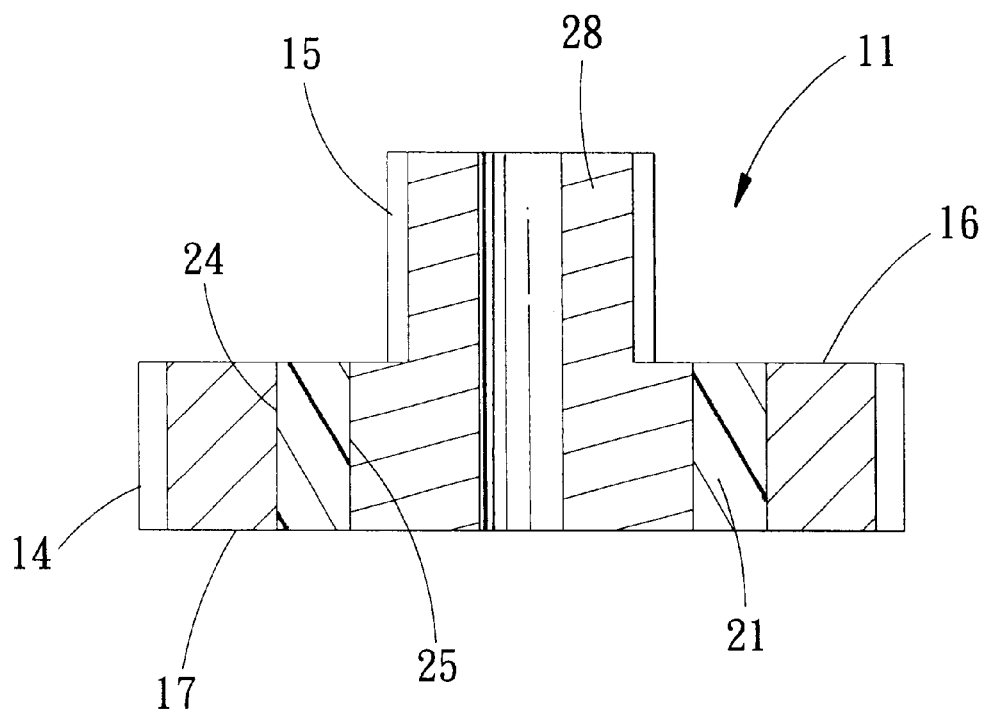
FIG. 8 is a further structural schematic view of the present invention.

Referring to FIG. 8, a reduction gear set 11 includes a first gear 14 combined with a second gear 15. The first gear 14 and the second gear 15 are connected co-axially. The first gear 14 is formed with a through hole 24 that penetrates the first surface 16 and the second surface 17. A vibration reduction portion 21 is mounted in the through hole 24. The center of the vibration reduction portion 21 is formed with a through hole 25. The second gear 15 is mounted in the through hole 25 of the vibration reduction portion 21, and is rested on and joined with the vibration reduction portion 21.

In addition, in the embodiment, the vibration reduction portion 21 may be integrally formed on the outer periphery of the lower section 28 of the second gear 15. The lower section 28 of the second gear 15 and the vibration reduction portion 21 may be mounted in the through hole 24 of the first gear 14, to combine with the first gear 14.

Thus, when the reduction gear set 11 is rotated at a high speed, the vibration produced between the first gear 14 and the second gear 15 may be absorbed by the vibration reduction portion 21, thereby preventing noise from being produced.

Figure 9:
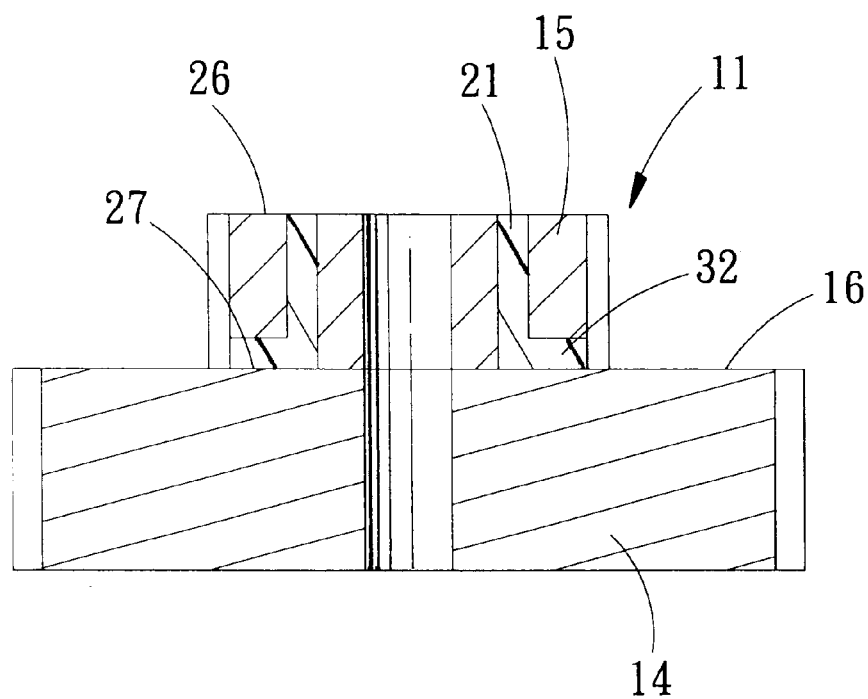
FIG. 9 is a further structural schematic view of the present invention.

Referring to FIG. 9, the reduction gear set 11 includes a first gear 14 combined with a second gear 15. The first gear 14 and the second gear 15 are connected co-axially. The second gear 15 may be provided with a vibration reduction portion 21.

The vibration reduction portion 21 may be mounted between the first surface 26 and the second surface 27 of the second gear 15 in an annular manner. The vibration reduction portion 21 is formed with a transverse face 32 rested on and contacting with the first surface 16 of the first gear 14. Thus, when the reduction gear set 11 is rotated at a high speed, the vibration produced between the first gear 14 and the second gear 15 may be absorbed by the vibration reduction portion 21, thereby preventing noise from being produced.

Figure 10:
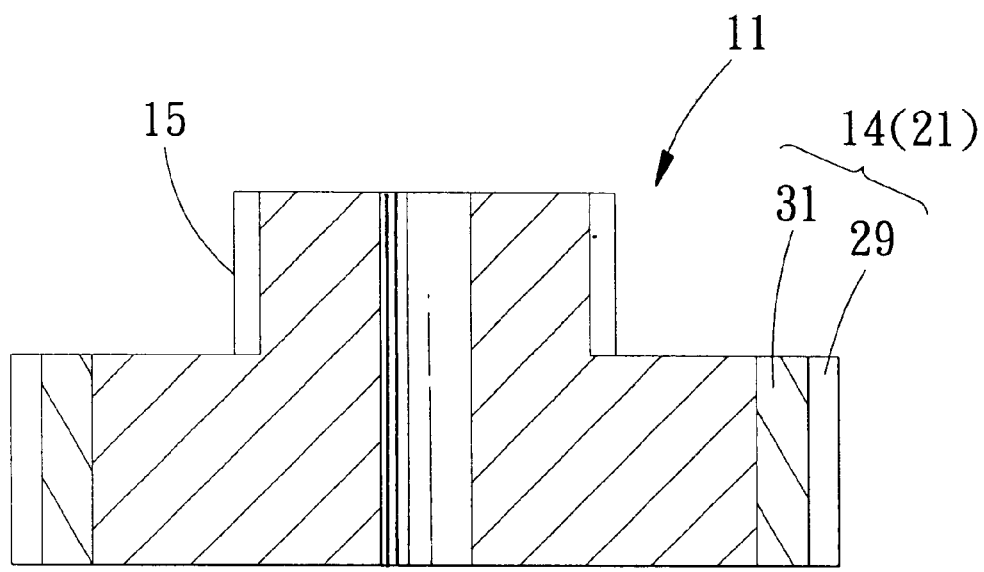
FIG. 10 is a further structural schematic view of the present invention.

Referring to FIG. 10, the reduction gear set 11 includes a first gear 14 combined with a second gear 15. The first gear 14 and the second gear 15 may be formed integrally. The second gear 15 is made of rigid material, and the first gear 14 is made of vibration reduction material. That is, both of the tooth portion 29 and root portion 31 of the first gear 14 are made of vibration reduction material, thereby forming a vibration reduction portion 21.

Thus, when the first gear 14 receives the power, the vibration force of the root portion 29 will be absorbed by the vibration reduction portion 21. Thus, the vibration producing between the first gear 14 and the second gear 15 may be isolated, thereby preventing noise from being produced.

Referring to FIG. 11, the vibration reduction portion 21 may be mounted in the first gear 14 and the second gear 15 simultaneously. The vibration reduction portion 21 formed on the first gear 14 and the vibration reduction portion 21 formed on the second gear 15 may abut each other. The vibration reduction portion 21 formed on the first gear 14 and the vibration reduction portion 21 formed on the second gear 15 may also stagger each other without contact (not shown).

Figure 12:
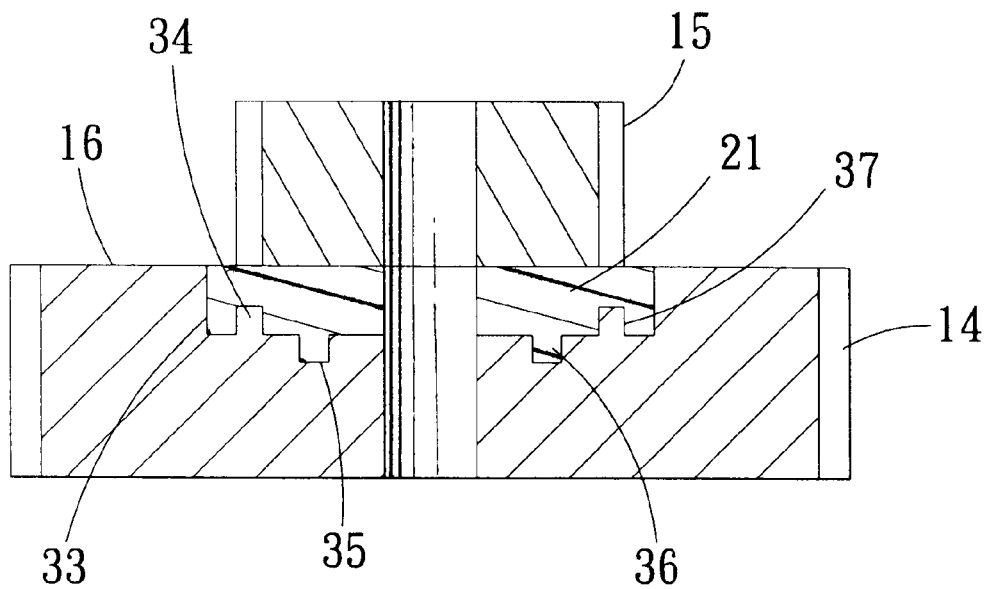
FIG. 12 is a further structural schematic view of the present invention.

Referring to FIG. 12, the vibration reduction portion 21 and the first gear 14 are combined by using a concave and convex assembly manner. The first surface 16 of the first gear 14 is formed with a cavity 33. The cavity 33 is formed with convex teeth 34 and concave teeth 35. The vibration reduction portion 21 is also formed with convex teeth 36 and concave teeth 37, to form a concave and convex assembly with the convex teeth 34 and concave teeth 35 of the cavity 33, thereby achieving the effect of convenient assembly and positioning. The same design may be used between the vibration reduction portion 21 and the second gear 15.

Accordingly, the vibration reduction portion 21 may be selectively mounted on the first gear 14 or the second gear 15. It is to be noted that the torque transmission path of the reduction gear set 11 may be input from the outer edge of the first gear 14, to rotate the rotation shaft (not shown) mounted in the center of the first gear 14 and the second gear 15, to rotate the second gear 15, and the power is output from the outer edge of the second gear 15. Thus, by provision of the vibration reduction portion 21 in the torque transmission path, the vibration reduction portion 21 may contact the first gear 14 and the second gear 15 respectively. Thus, the vibration produced between the first gear 14 and the second gear 15 may be isolated, thereby preventing noise from being produced.

The vibration reduction portion 21 may be individually mounted in the first gear 14 or the second gear 15. The vibration reduction portion 21 may also be mounted in the first gear 14 and the second gear 15 simultaneously.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A vibration reduction gear structure of an image input and output device, comprising:
    a first gear;
    a second gear, co-axially connected with the first gear so as to rotate synchronously; and
    a vibration reduction portion, mounted on at least one of the first gear and the second gear, thereby isolating transmission of vibration between the first gear and the second gear.

2. The vibration reduction gear structure of an image input and output device in accordance with claim 1, wherein the vibration reduction portion and the first gear are formed integrally.

3. The vibration reduction gear structure of an image input and output device in accordance with claim 1, wherein the vibration reduction portion and the second gear are formed integrally.

4. The vibration reduction gear structure of an image input and output device in accordance with claim 1, wherein the vibration reduction portion is mounted at a central position of the first gear.

5. The vibration reduction gear structure of an image input and output device in accordance with claim 1, wherein the vibration reduction portion is mounted at a central position of the second gear.

6. The vibration reduction gear structure of an image input and output device in accordance with claim 1, wherein the vibration reduction portion is mounted between two opposite surfaces of the first gear in an annular manner, and contacts a surface of the second gear.

7. The vibration reduction gear structure of an image input and output device in accordance with claim 1, wherein the vibration reduction portion is mounted between two opposite surfaces of the second gear in an annular manner, and contacts a surface of the first gear.

8. The vibration reduction gear structure of an image input and output device in accordance with claim 1, wherein the first gear has a surface formed with a receiving hole, and the vibration reduction portion is mounted in the receiving hole.

9. The vibration reduction gear structure of an image input and output device in accordance with claim 1, wherein the vibration reduction portion is formed on an outer periphery of a lower section of the second gear, and the lower section of the second gear and the vibration reduction portion are mounted in the first gear, to combine with the first gear.

10. The vibration reduction gear structure of an image input and output device in accordance with claim 1, wherein an annular vibration reduction portion is mounted between two opposite surfaces of the first gear, and a lower section of the second gear is mounted and positioned in a center of the vibration reduction portion.

11. The vibration reduction gear structure of an image input and output device in accordance with claim 1, wherein the vibration reduction portion is integrally formed with at least one or both of the first gear and the second gear.

12. The vibration reduction gear structure of an image input and output device in accordance with claim 1, wherein at least one of the first gear and the second gear is formed with a cavity, the cavity is formed with convex teeth and concave teeth, and the vibration reduction portion is formed with convex teeth and concave teeth, to form a concave and convex assembly with the convex teeth and concave teeth of the cavity.

* * * * *